(12) United States Patent
Jäger et al.

(10) Patent No.: US 7,669,893 B2
(45) Date of Patent: Mar. 2, 2010

(54) GAS GENERATOR

(75) Inventors: Stefan Jäger, Mutlangen (DE); Thomas Dirnberger, Aschaffenburg (DE); Christophe Dervyn, Schwalbach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/216,923

(22) Filed: Jul. 11, 2008

(65) Prior Publication Data
US 2009/0020992 A1   Jan. 22, 2009

Related U.S. Application Data

(63) Continuation of application No. PCT/EP2007/000257, filed on Jan. 12, 2007.

(30) Foreign Application Priority Data
Jan. 12, 2006  (DE) ............... 10 2006 002 435

(51) Int. Cl.
B60R 21/264 (2006.01)
(52) U.S. Cl. .................. 280/741; 280/736
(58) Field of Classification Search .......... 280/741, 280/736; 102/530, 531
See application file for complete search history.

(56) References Cited

U.S. PATENT DOCUMENTS

| | | | |
|---|---|---|---|
| 5,100,170 A | 3/1992 | Mihm et al. | |
| 5,397,544 A * | 3/1995 | Kobari et al. | 422/167 |
| 5,533,754 A | 7/1996 | Riley | |
| 5,623,115 A * | 4/1997 | Lauritzen et al. | 102/288 |
| 6,029,994 A | 2/2000 | Perotto et al. | |
| 6,196,584 B1 | 3/2001 | Shark et al. | |
| 6,382,668 B1 * | 5/2002 | Goetz | 280/737 |
| 6,634,302 B1 | 10/2003 | Rink et al. | |
| 6,823,796 B1 | 11/2004 | Amano | |

(Continued)

FOREIGN PATENT DOCUMENTS

DE   42 01 651 A 1   7/1992

(Continued)

OTHER PUBLICATIONS

Examination Report issued by German Intellectual Property Office dated Mar. 30, 2009 for German Patent Application No. 10 2006 002 435.4.

Primary Examiner—Paul N Dickson
Assistant Examiner—Drew Brown
(74) Attorney, Agent, or Firm—Foley & Lardner LLP

(57) ABSTRACT

A method of producing a gas generator includes arranging an igniter in an inner chamber surrounded by a housing of the gas generator. The igniter is supported in a first direction on a part of the gas generator and in the first direction opposite a mounting orifice of the housing. The method includes arranging a sealing element in the mounting orifice to seal the mounting orifice. The sealing element presses over a bearing area deformable in the first direction with a force acting in the first direction against a first bearing area of the igniter and forms a gas-tight joint between the sealing element and the igniter. A side of the sealing element facing the part of the gas generator in the first direction abuts against a side of the part of the gas generator to limit deformation of the bearing area of the sealing element in the first direction.

31 Claims, 3 Drawing Sheets

U.S. PATENT DOCUMENTS

| | | | |
|---|---|---|---|
| 6,851,373 B2 | 2/2005 | Quioc | |
| 6,935,655 B2 | 8/2005 | Longhurst et al. | |
| 7,080,854 B2 * | 7/2006 | Burns et al. | 280/741 |
| 7,185,588 B2 * | 3/2007 | Clark et al. | 102/530 |
| 7,192,055 B2 * | 3/2007 | Stevens et al. | 280/741 |
| 2005/0116454 A1 | 6/2005 | Stevens et al. | |
| 2005/0151358 A1 * | 7/2005 | Burns et al. | 280/741 |
| 2005/0218637 A1 * | 10/2005 | Burns | 280/741 |
| 2006/0001246 A1 | 1/2006 | Gotoh et al. | |
| 2006/0022444 A1 * | 2/2006 | Khandhadia et al. | 280/736 |
| 2006/0273564 A1 * | 12/2006 | McCormick et al. | 280/740 |
| 2007/0108751 A1 * | 5/2007 | Mayville et al. | 280/741 |

FOREIGN PATENT DOCUMENTS

| | | |
|---|---|---|
| DE | 43 02 111 C1 | 6/1994 |
| DE | 196 22 025 A1 | 12/1996 |
| DE | 199 54 875 A1 | 6/2000 |
| DE | 600 08 844 T2 | 1/2005 |
| EP | 0 546 791 A1 | 6/1993 |
| WO | WO 03/072394 A2 | 9/2003 |
| WO | WO 2005/118356 | 12/2005 |

* cited by examiner

GAS GENERATOR

CROSS-REFERENCE TO RELATED APPLICATION

This application is a Continuation of International Application No. PCT/EP2007/000257, filed Jan. 12, 2007, which was published in German as WO 2007/082689. The foregoing International Application is incorporated herein by reference in its entirety.

BACKGROUND

The present application relates to a method of producing a gas generator and a gas generator produced using the method. Gas generators are used in particular in airbag modules (for example for motor vehicles) and release gas that is used to inflate an airbag of the airbag module.

Conventional gas generators provide a necessary quantity of gas and include an igniter to ignite a propellant located in a housing of the gas generator. In conventional gas generators the igniter is generally introduced through a mounting orifice into the housing. The mounting orifice is sealed, for example, with a sealing element. A joint between the igniter and the sealing element has to be gas-tight so that no gases generated by the gas generator can flow out of the mounting orifice. In conventional gas generators the sealing means is initially clamped together or form fit with the igniter. The sealing element has a relatively complex form and thus results in cost-intensive production of the sealing element. The sealing element and the igniter are introduced through the mounting orifice into the housing. The mounting orifice is closed (i.e. sealed) by the sealing element.

SUMMARY

One embodiment of the application relates to a method of producing a gas generator includes arranging an igniter in an inner chamber surrounded by a housing of the gas generator. The igniter is supported in a first direction on a part of the gas generator and in the first direction opposite a mounting orifice of the housing. The method also includes arranging a sealing element in the mounting orifice to seal the mounting orifice. The sealing element presses over a bearing area deformable in the first direction with a force acting in the first direction against a first bearing area of the igniter and forms a gas-tight joint between the sealing element and the igniter. A side of the sealing element facing the part of the gas generator in the first direction abuts against a side of the part of the gas generator to limit deformation of the bearing area of the sealing element in the first direction.

Another embodiment of the application relates to a gas generator including a housing surrounding an inner chamber of the gas generator. The gas generator also includes an igniter for igniting the gas generator to generate a gas. The igniter is supported in a first direction on a part of the gas generator. The gas generator also includes a mounting orifice of the housing through which components of the gas generator may be introduced into the inner chamber during mounting of the gas generator. The gas generator also includes a sealing element for sealing the mounting orifice. The sealing element is arranged in the mounting orifice to press against a first bearing area of the igniter via a bearing area deformable in the first direction with a force acting in the first direction. A gap is defined between the sealing element and the part of the gas generator when the two bearing areas come into surface contact when moving in the first direction. The gap is closable by pressing the sealing element in the first direction towards the first bearing area, limiting deformation of the bearing area of the sealing element in the first direction.

DETAILED DESCRIPTION

Figure 1:
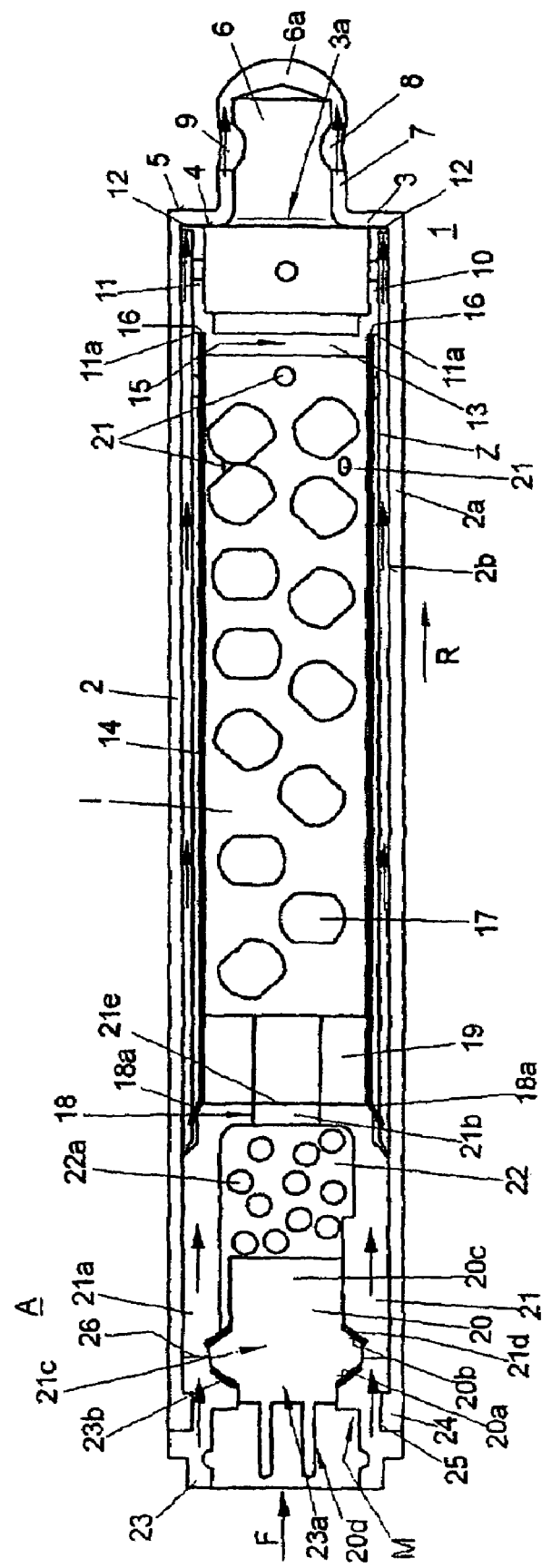
FIG. 1 is a schematic sectional view of a gas generator, according to an exemplary embodiment.

According to an exemplary embodiment, a gas generator includes a gas-tight joint between an igniter and a sealing element. The joint may be manufactured in a simple and cost-effective manner.

An igniter is arranged in an inner chamber surrounded by a housing and may be supported in a first direction on a part of the gas generator (e.g. an igniter cap) opposite a mounting orifice of the housing in the first direction. A sealing element is arranged in or at the mounting orifice of the housing for sealing the mounting orifice in such a way that the sealing element presses with a deformable bearing area in the first direction against the bearing area of the igniter. The pressing of the sealing element against the bearing area forms a gas-tight joint between the sealing element and the igniter. A side of the sealing element facing the part of the gas generator in the first direction may abut against a side facing the sealing element in the first direction to limit deformation of the bearing area.

The gas-tight joint between the sealing element and the igniter is produced when the mounting orifice closes. The mounting orifice is closed when the sealing element presses against the igniter in the first direction after the sealing element is arranged in the mounting orifice. Preferably, the sealing element is joined or form-fit to the housing through the action of an axial force (e.g., in the first direction) and presses against the igniter in the first direction to form the gas-tight joint between the sealing element and the igniter.

The sealing element may be any simple geometric form capable of forming a gas-tight joint. Further, in a method of manufacture, the additional mounting step for clamping the sealing element together with the igniter to form a gas-tight joint between sealing element and igniter may be omitted.

By varying the length of the gap path between the side of the sealing element and the side of the gas generator, the deformation of the bearing area (e.g., sealing element) and the force with which the sealing element presses against the igniter may be adjustable and reproducible. The gap path may be selected in such a way that it is not closed or is still open under the greatest possible deformation of the bearing area (and optionally other bearing areas).

The bearing area of the igniter is deformed by the force such that the two bearing areas press against one another to form a gas-tight joint. One of the two bearing areas may be a non-deformable, smooth bearing face, while the other bearing area may be constructed as a seal element which rests against the bearing face to form the gas-tight joint. Both bearing areas may also be constructed of a sealing element.

The sealing element is arranged such that an opening in the sealing element surrounds the igniter. In this case, the contact zone of the igniter is guided through the opening in the sealing element, so that the contact zone is accessible from the outer chamber of the housing once the sealing element has been arranged in the mounting orifice. The sealing element may be cylindrical in shape with two orifices, located opposite each other. The contact zone of the igniter may be introduced such that the contact zone is accessible from the outer chamber of the housing. A free end of the sealing element bounding the first orifice in the sealing element forms a bearing face, which presses against a bearing face of the igniter to form a gas-tight joint.

In an exemplary embodiment, the sealing element may be arranged in the mounting orifice so a bearing area of the sealing element presses against the igniter to form a gas-tight joint.

According to an exemplary embodiment, igniter caps may be arranged in the inner chamber of the housing. The igniter caps surround a pressure chamber of the gas generator, which is filled with an ignition charge that may be ignited by the igniter. The ignition charge is ignited, releasing gases that rupture a tear zone of the igniter cap. The released gases ignite the propellant stored in a housing adjacent the pressure chamber, which generates the gas needed for inflation of an airbag.

The side of the sealing element facing the igniter cap in the first direction may abut against the side of the igniter cap facing the sealing element in the first direction to limit deformation of the bearing area of the sealing element and of the first bearing area of the igniter in the first direction.

According to an exemplary embodiment, the igniter cap may be arranged in the inner chamber of the housing so that an orifice in the igniter cap faces the mounting orifice in the housing in the first direction.

The sealing element may be preassembled with the igniter outside the inner chamber of the housing to form a sub-module. The igniter is prefixed to the sealing element so that the bearing area of the sealing element faces the first bearing area of the igniter. The two bearing areas are pressed together when the sealing element is pressed against the igniter in the first direction.

The sub-module may be introduced with an igniter in the first direction into the housing through the mounting orifice so that the sealing element is in the mounting orifice. An igniter in the housing is supported by and abuts against part of the gas generator. The part of the gas generator absorbs the force that the sealing element presses against the igniter.

An igniter may be arranged in the inner chamber of the gas generator to cover the orifice in the igniter cap to form a pressure chamber of the gas generator.

An igniter may be introduced with a free end portion into the orifice in the igniter cap, the igniter being positioned transverse to the first direction. The orifice in the igniter cap may be constructed so that it tapers in the first direction with the igniters free end portion centered in the orifice.

The sealing element may be arranged in the mounting orifice so that the igniter is pressed for gas-tight closure of the pressure chamber. A second bearing area of the igniter cap may surround the orifice of the igniter cap by the force acting in the first direction.

The second bearing area of the igniter and/or the bearing area of the igniter cap may be deformed in the first direction by the force so the two bearing areas rest against one another for gas-tight closure of the pressure chamber. One of the two bearing areas may take the form of a sealing element while the other bearing area may take the form of a hard, smooth bearing face against which the sealing element is pressed. Both bearing areas may also be of resilient and deformable construction in the first direction.

A side of the sealing element facing the igniter cap in the first direction may abut against a side of the igniter cap facing the sealing element in the first direction and limit deformation of the second bearing area of the igniter cap in the first direction.

A baffle element for swirling gases released by the gas generator may be arranged in the inner chamber of the housing. The baffle element is supported against an inner side of the housing facing the mounting orifice in the first direction.

A spring element may be arranged in the first direction between the inner side and the baffle element. The spring element may be generally resilient and deformable in the first direction.

According to an exemplary embodiment, a propellant can is arranged in the inner chamber of the housing and supported against the baffle element with a peripheral area opposite the baffle element in the first direction. The propellant can serve as a container for a propellant that is ignited by the igniter to generate the gas necessary for inflation of an airbag.

In an exemplary embodiment, a generally resilient and deformable volume compensating element may be introduced into the propellant can in the first direction. The volume compensating element occupies a part of the propellant can not filled with propellant so that movement of the propellant in the first direction is suppressed by the volume compensating element.

In an exemplary embodiment, the sealing element may be arranged in the mounting orifice so the force exerted by the sealing element on the igniter is introduced into the housing via the propellant can and the baffle element.

A spring element may be arranged between the baffle element and the inner side of the housing to absorb the force the sealing element exerts against the igniter in the first direction. The force exerted on the igniter by the sealing element is transmitted via the igniter cap to the propellant can, passed from the propellant can into the baffle element, which transmits the force to the spring element. The spring element is then put under tension by the force in the first direction.

The sealing element may be clamped or form fit with an area of the housing surrounding the mounting orifice to generate the force acting in the first direction. The area clamped together projects transverse to the first direction into an inner chamber surrounded by the housing and engages transverse to the first direction in a recess of the sealing element.

In an alternative embodiment, the sealing element may be screwed into the mounting orifice to generate the force acting in the first direction that presses against the igniter.

According to an exemplary embodiment, a gas generator may include a housing that surrounds an inner chamber. An igniter for igniting the gas generator to generate a gas is supported in a first direction against a part of the gas generator. A mounting orifice of the housing, through which components of the gas generator may be introduced into the inner chamber during production, includes a sealing element for sealing the mounting orifice. The sealing element is arranged in the mounting orifice to press against a first bearing area of the igniter via a bearing area deformable in the first direction with a force acting in the first direction. A gap is formed between the sealing element and the part of the gas generator when the two bearing areas come into surface contact when moving in the first direction.

The sealing element arrangement may enable the production of a gas-tight joint between the sealing element and the igniter, which may not require the sealing element to have a complex form. To form the gas-tight joint, the igniter presses against the sealing element in the first direction. Deformation of the bearing area of the sealing element in the first direction is reproducible, as is the force with which the sealing element presses against the igniter in the first direction.

In an alternative embodiment, the first bearing area of the igniter may be a seal element deformable in the first direction so that the two bearing areas pressed together in the first direction abut against one another. The bearing area of the sealing element or the first bearing area of the igniter may in be a sealing ring arranged in the first direction between the sealing element and the igniter. The sealing ring may be fixed to the sealing element or the igniter so it does not have to be arranged separately during production. A seal element may also be attached to the sealing element or the igniter by an adhesive, forming a bearing area deformable in the first direction. Both bearing areas may be of flexible construction in the first direction. The gap is closable by pressing the sealing element in the first direction limiting deformation of the first seal element in the first direction.

In an exemplary embodiment, the sealing element may comprise an opening for receiving a contact zone for activating the igniter. The opening serves to guide the contact zone of the igniter out of the inner chamber so that it is accessible from the outer chamber.

In an exemplary embodiment, the bearing area of the sealing element may annularly surround the opening transverse to the first direction.

In an exemplary embodiment, the sealing element and the igniter may close the mounting orifice in a gas-tight manner. The sealing element and the igniter form a preassembled sub-module, in which the igniter is prefixed to the sealing element such that the two elements may both be introduced into the housing.

In an exemplary embodiment, the part of the gas generator supporting the igniter may comprise an igniter cap which surrounding a pressure chamber of the gas generator. The pressure chamber compresses hot gases generated by ignition of an ignition charge within the pressure chamber. These hot gases are passed in the gas generator to the propellant, igniting the propellant. This generates the gas necessary for inflating an airbag.

In an exemplary embodiment, the igniter cap may comprise an orifice opposite the mounting orifice in the first direction. Through this orifice an ignition charge may be introduced into the pressure chamber. The orifice of the igniter cap is bound by a bearing area of the igniter cap that annularly surrounds the orifice.

In an exemplary embodiment, the bearing area of the igniter cap may comprise a funnel for positioning the igniter relative to the igniter cap in a plane oriented perpendicular to the first direction.

In an exemplary embodiment, the sealing element may be arranged in the mounting orifice to press the igniter with a second bearing area against the bearing area of the igniter cap with the force acting in the first direction for gas-tight closure of the pressure chamber.

The second bearing area of the igniter and/or the bearing area of the igniter cap may be a second seal element deformable in the first direction. The second seal element is deformed in the first direction so the two bearing areas rest against one another to form a seal.

The seal element may take the form of a sealing ring, arranged on the igniter or the igniter cap forming the bearing area of the igniter or the igniter cap. This seal element may be fixed to the igniter or the igniter cap or foamed directly onto the igniter or the igniter cap. Both bearing areas may also be made to be resilient and deformable in the first direction (e.g., to rest against one another).

In an exemplary embodiment, the circumferential gap between the sealing element and the igniter cap may be closable by pressing the sealing element in the first direction, limiting deformation of the second seal element in the first direction.

In an exemplary embodiment, the gas generator may comprise a propellant can filled with propellant and extending in the first direction in the inner chamber of the housing. A volume compensating element is introduced in the first direction into the propellant can, the volume compensating element pressing against the propellant so that movement of the propellant is suppressed. The volume compensating element may consist of non woven, heat resistant metal fiber that is not burned by the hot gases which arise on ignition of a propellant or an ignition charge.

In an exemplary embodiment, the propellant can may comprise a first orifice opposite the mounting orifice in the first direction. The first orifice of the propellant can is bound by a first peripheral area of the propellant can.

In an exemplary embodiment, the igniter cap may be supposed in the first direction against the first peripheral area of the propellant can so the force that the sealing element exerts in the first direction on the igniter is introduced into the housing via the propellant can.

In an exemplary embodiment, the propellant can may comprise a second orifice located opposite the first orifice in the first direction. The propellant can is supported with a second peripheral area that bounds the second orifice against a baffle element arranged in the first direction between the propellant can and an inner side of the housing facing the mounting orifice. The baffle element comprises a flat zone that extends transverse to the first direction and closes the second orifice of the propellant can.

The gases generated in the propellant can may impinge on the flat zone, where they are swirled and may escape from the propellant can transverse to the first direction through first outflow orifices constructed on the propellant can along the first peripheral area. The swirled gases pass from the first outflow orifices in the propellant can to second outflow orifices, that are constructed on the inner side which faces the mounting orifice in the first direction.

The baffle element may be supported in the first direction against the inner side of the housing so that the force the sealing element exerts on the igniter is introduced into the housing via the igniter cap, the propellant can and the baffle element.

According to an exemplary embodiment, the baffle element may be supported in the first direction on a spring element arranged between the inner side and the baffle element in the first direction to absorb the force the sealing element exerts on the igniter. The spring element may be designed so that the sealing element presses against the igniter with the force in the first direction, upon arrangement of the sealing element in the mounting orifice.

According to an exemplary embodiment, the sealing element may be clamped together with an area of the housing so the sealing element presses against the igniter with the force acting in the first direction. The area of the housing projects from the housing transverse to the first direction into an inner chamber of the housing and engages in a recess in the sealing element. The recesses comprise a groove surrounding the sealing element. Reshaping a housing part including said area leads to that area engaging in the recess to secure the sealing element in the mounting orifice.

In an exemplary embodiment, the sealing element may be screwed into the mounting orifice so the sealing element presses against the igniter with the force acting in the first direction.

The force acting in the first direction may be applied upon arrangement of the sealing element in the mounting orifice. The sealing element is arranged in the mounting orifice so that the force exerted on the igniter by the sealing element is maintained or remains effective.

Details and advantages of the invention are clarified in the following description of exemplary embodiments made with reference to the Figures, in which:

FIG. 1 shows a schematic sectional view of a gas generator 1, with a housing 2 extending lengthwise in a first direction R. The housing 2 of the gas generator 1 is of cylindrical construction and surrounds an inner chamber I of the gas generator 1. Components of the gas generator 1 may be introduced into the inner chamber I through a mounting orifice M in the housing 2 in the first direction R, for example upon production of the gas generator 1.

The cylindrical axis of the housing 2 of the gas generator 1 extends in the first direction R and lies in the section plane of the sectional representation shown in FIG. 1. The mounting orifice M is formed by an open side of the housing 2 and bounded by a shell 2a extending in the first direction R of the housing 2. The mounting orifice M lies opposite a side wall 3 of the housing 2 in the first direction R. The side wall may be of circular construction and comprises an inner side 4 facing the mounting orifice M. From an outer side 5 (remote from the inner side 4) of the side wall 3 a gas outlet member 6 projects from the outer side 5 in the first direction R. The gas outlet member 6 has a smaller diameter transverse to the first direction R than the side wall 3 (or the shell 2a) and is connected to the inner chamber I of the housing 2 via an orifice 3a formed centrally in the side wall 3.

On a cylindrical shell-type side wall 7, a first and a second outflow orifice 8, 9 extend in the first direction R of the gas outlet member 6. Gas may flow into the outer chamber A surrounding the gas generator 1 through the two outflow orifices 8, 9. The two outflow orifices 8, 9 are located opposite one another transverse to the first direction R. A circular side wall 6a located opposite the orifice 3a projects from the side wall 7 of the gas outlet member 6 transverse to the first direction R.

A cylindrical baffle element 10 is introduced through the mounting orifice M in the housing 2 in the first direction R into the inner chamber I of the housing 2. The baffle element 10 comprises a shell-type wall 11, which is arranged relative to the shell 2a of the housing 2 transverse to the first direction R. The baffle element 10 has a diameter transverse to the first direction R which is smaller than the internal diameter of the housing 2 transverse to the first direction R. The cylinder axis of the baffle element 10 is aligned with the cylinder axis of the housing 2.

The baffle element 10 is open towards the orifice 3a of the gas outlet member 6 in the first direction R and comprises an orifice bounded by an annular peripheral area 12. The annular peripheral area 12 surrounds the orifice of the cylindrical wall 11 of the baffle element 10. The peripheral area 12 of the baffle element 10 faces the inner side 4 of the side wall 3 of the housing 2 and is supported there in the first direction R.

A flat area 13 of the baffle element 10 lies opposite the orifice surrounded by the peripheral area 12 of the baffle element 10 in the first direction R. The flat area 13 extends transverse to the first direction R and forms a circular base for the baffle element 10.

The flat area 13 of the baffle element 10 has a diameter transverse to the first direction R which is smaller than the diameter of the shell-type wall 11 of the baffle element 10. The step 11a of the baffle element 10 is formed at an outer edge of the flat area 13 surrounding the flat area 13 transverse to the first direction R. The step 11a lies opposite the mounting orifice M in the first direction R.

A cylindrical propellant can 14 is supported on the baffle element 10 in the first direction R. The cylindrical axis of the baffle element 10 is aligned with the cylindrical axis of the housing 2. The external diameter of the propellant can 14 corresponds to the external diameter of the baffle element 10 (or the cylindrical wall 11 of the baffle element 10) transverse to the first direction R. The propellant can 14 is spaced transverse to the first direction R from an inner side 2b of the shell 2a of the housing 2 facing the inner chamber I.

The propellant can 14 comprises a first orifice 18 facing the mounting orifice M in the first direction R. The first orifice 18 is annularly surrounded by a first peripheral area 18a and a second orifice 15 lying opposite the first orifice 18. The second orifice 15 is closed by the flat area 13 of the baffle element 10. The second orifice 15 of the propellant can 14 is bounded by a second peripheral area 16, which surrounds the second orifice 15 transverse to the first direction R and faces the side wall 3 of the housing 2 in the first direction R. With the second peripheral area 16 the propellant can 14 is supported by the step 11a of the baffle element 10 so a force F introduced into the propellant can 14 extends in the first direction R and is introduced without a change in direction into the cylinder shell-type wall 11 of the baffle element 10. The force F is then transmitted via the peripheral area 12 of the baffle element 10 to the side wall 3.

The propellant can 14 is filled with a tablet-form propellant 17 (shown schematically in FIG. 1). The filling may take place through the first orifice 18, which faces the mounting orifice M. A volume compensating element 19 is introduced into the propellant can 14 filled with tablet-form propellant 17 in the first direction R through the first orifice 18 of the propellant can 14. The volume compensating element 19 may be constructed of non woven fiber and serves to fill a part of the propellant can 14 not filled with propellant 17 to suppress movement of the propellant 17 in the first direction R.

Ignition of the propellant 17 proceeds through the first orifice 18 of the propellant can 14. Heat is provided by means of an igniter 20 that ignites the propellant 17 converting the propellant into a gas. The gas diffuses in the propellant can 14 and flows into the second orifice 15 and is swirled as it abuts against the flat area 13 of the baffle element 10. Outflow orifices 21 are formed adjacent the flat area 13 in a circumferential direction surrounding the propellant can 14 transverse to the first direction R. Through the orifices the gas may escape from the propellant can 14 and enter a space surrounding the propellant can 14 where it is in turn surrounded by the inner side 2b of the shell 2a of the housing 2. From there, the gas enters the baffle element 10 via inflow orifices formed in the wall 11 of the baffle element 10. Then, the gas enters the gas outlet member 6 of the housing 2 through the opening 3a in the side wall 3. The gas outlet member 6 comprises the first and the second outflow orifices 8, 9 in its wall 7 for outflow of the gas. In order to introduce the gases released by the gas generator 1 into an airbag, these two outflow orifices 8, 9 are joined to an inflow orifice of the airbag, or arranged within an airbag inner chamber that may be filled with gas.

An igniter cap 21 is configured to provide enough heat to ignite the propellant 17. The igniter cap surrounds a pressure chamber 22 in which an igniter 22a is mounted. The ignition chamber 21 is of cylindrical construction and comprises a shell-type wall 21a that has an external diameter transverse to the first direction R. The wall 21a of the ignition chamber 21 rests against the inner side 2b of the shell 2a. The igniter cap 21 has a circular base 21b, oriented perpendicularly to the first direction R, and protrudes at right angles from the wall 21a of the igniter cap 21. The base 21b of the igniter cap 21 is introduced into the first orifice 18 of the propellant can 14 in the first direction R and rests against the volume compensating element 19. The igniter cap 21 is supported by its base 21b against the first peripheral area 18a of the propellant can 14, which annularly surrounds the first orifice 18 of the propellant can 14 transverse to the first direction R.

The igniter 20 is introduced into an orifice 21c in the igniter cap 21 that faces the mounting orifice M of the housing 2 in the first direction R. The igniter 20 surrounds the pressure chamber 22 together with the igniter cap 21. The igniter 20 comprises a first and a second bearing area 20a, 20b, which face away from one another in the first direction R and annularly surround the igniter 20 transverse to the first direction R. The second bearing area 20b of the igniter 20 faces the igniter cap 21 in the first direction R and rests against a bearing area 21d of the igniter cap 21, that is deformable in the first direction R.

The bearing area 21d of the igniter cap 21 comprises a funnel, so that the igniter 20 is centered transverse to the first direction R in the orifice 21c in upon introduction of a free end area 20c of the igniter 20.

The igniter 20 is pressed by a sealing element 23 in the first direction R against the igniter cap 21, so that the bearing area 21d of the igniter cap 21 is deformed in the first direction R and thus rests on the second bearing area 20b of the igniter 20 for gas-tight closure of the pressure chamber 22.

The igniter 20 is activated via a contact zone 20d and then ignites the ignition charge 22a. The ignition generates a hot gas that is compressed in the pressure chamber 22 until the pressure of the ignition gas ruptures a tear zone 21e of the base 21b of the igniter cap 21. The hot ignition gas may diffuse through the volume compensating element 19 in the first direction R to ignite the propellant 17 arranged in the propellant can 14.

An opening 23a in the sealing element 23 is arranged in the mounting orifice M. The contact zone 20d of the igniter 20 is guided into the outer chamber A through the opening 23q so that the contact zone 20d of the igniter 20 may be contacted from the outer chamber A of the gas generator 1.

The opening 23a in the sealing element 23 is annularly surrounded by a bearing area 23b of the sealing element 23 transverse to the first direction R. The bearing area 23b may be deformable and press with a force F in the first direction R against the first bearing area 20a of the igniter 20. The force F creates a gas-tight joint between the sealing element 23 and the igniter 20 so that no gas generated can pass between the igniter 20 and the sealing element 23 into the outer chamber A.

The sealing element 23 is clamped or form fit together with a peripheral area 24 of the shell 2a of the housing 2, for example by reshaping (crimping) of a part of the housing 2 and limiting the mounting orifice M. This form fit joint between the sealing element 23 and the shell 2a of the housing 2 is constructed so that the sealing element 23 presses against the first bearing area 20a of the igniter 20 in the first direction R with the force F. The igniter 20 presses with the force F with its second bearing area 20b against the bearing area 21d of the igniter cap 21. The force F is introduced into the wall 21a of the igniter cap 21. Since the igniter cap 21 is supported against the first peripheral area 18a of the propellant can 14, the force F is introduced via the first peripheral area 18a into the propellant can 14 in and transmitted from there via the step 11a to the baffle element 10, specifically to the wall 11 via which the force F is introduced into the side wall 3.

The propellant can 14 may generally be of rigid construction so that it is not compressed or compacted by the force F in the first direction R. The rigid construction allows the propellant 17 in the propellant can 14 to not be exposed in the first direction R to lasting pressure (in the first direction R).

The sealing element 23 is inserted into the mounting orifice M so that it presses with the force F in the first direction R against the igniter 20. A gas-tight joint is provided between both the igniter 20 and the sealing element 23 and between the igniter 20 and the igniter cap 21 (to form the gas-tight pressure chamber 22). Deformation of the bearing area 23b of the sealing element 23 and of the bearing area 21d of the igniter cap 21 may be determined by the width of a gap 26 formed in the first direction R between the sealing element 23 and the igniter cap 21 before the two bearing areas 23b, 21d are deformed in the first direction R to form a gas-tight joint. By pressing the sealing element 23 in the first direction R against the igniter 20 (and thus the igniter 20 against the igniter cap 21) the gap 26 is closed so that a side of the sealing element 23 presses against a side of the igniter cap 21 facing the side of the sealing element 23. The pressing of the sealing element 23 against the cap 21 limits the deformation of the two bearing areas 23b, 21d in the first direction R. The deformation of the two bearing areas 23b, 21d in the first direction may be adjusted by means of the width of the gap 26.

Production of gas generator 1 as described above may avoid a cost-intensive step in which the sealing element 23 is clamped together with the igniter 20 in a gas-tight manner. The sealing element 23 comprises a circumferential wall that may grip around the igniter 20 to clamping with the igniter 20 in a gas-tight manner. The sealing element 23 may include a complex geometric outer contour with large jumps in wall thickness.

The shell 2a of the housing 2 comprises an area 24 surrounding the mounting orifice M in an annular manner to clamp together the sealing element 23 with the housing 2. The area 24 protrudes from the inner side 2b of the shell 2a into the inner chamber I of the housing 2 transverse to the first direction R and may engage form fit in a groove 25 in the sealing element 23. The groove 25 surrounds the sealing element 23 in a circumferential direction surrounding the sealing element 23 transverse to the first direction R. The mounting orifice M or the part bounding the mounting orifice may be widened. After insertion of the sealing element 23, the housing 2 is reshaped so that the area 24 engages in the groove 25. The amount to which the sealing element 23 extends in the first direction R may be such that the sealing element 23 presses with the force F against the igniter 20 when it catches or engages with the groove 25.

Figure 2:
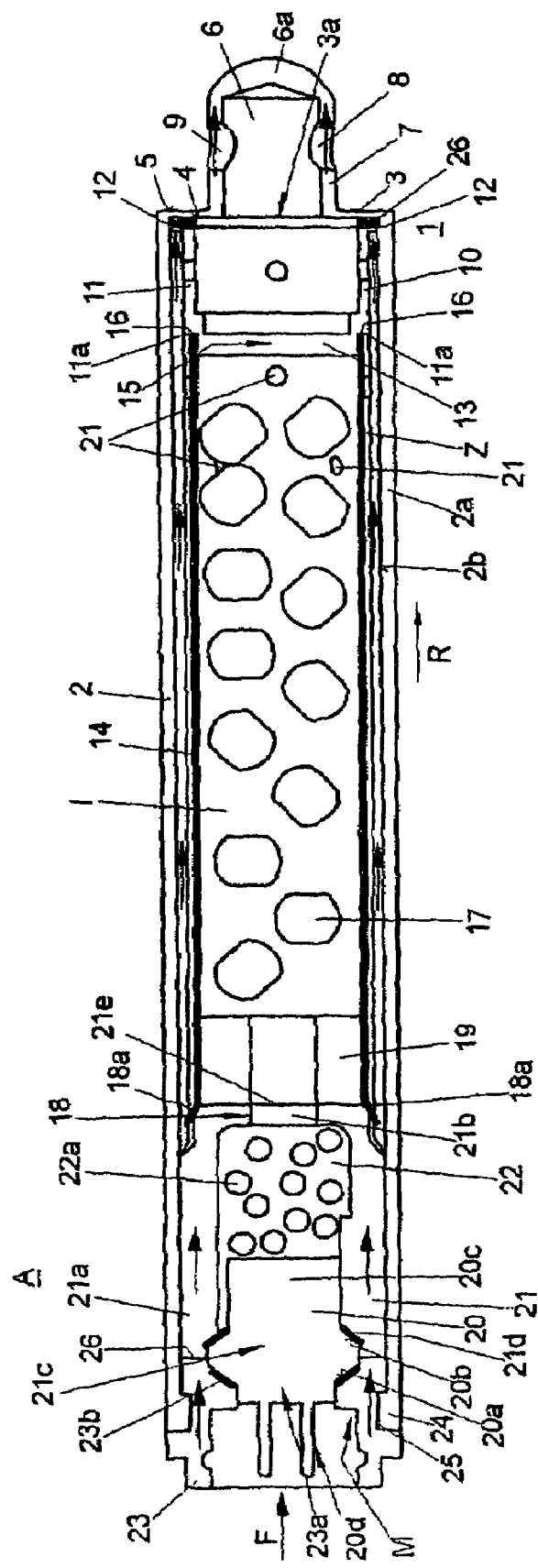
FIG. 2 shows a modification of the gas generator shown in FIG. 1, according to an exemplary embodiment.

FIG. 2 shows a modification of the gas generator 1 shown in FIG. 1, in which a spring element 26 is arranged between the first baffle element 10 and the side wall 3 of the housing 2 in the first direction R. The spring element 26 is generally resilient and compressible in the first direction R. The spring element 26 may be of one piece construction with the baffle element 10 or the baffle element 10 may take the form of the spring element. The spring element 26 is arranged between the baffle element 10 and the side wall 3 so that it is compressed in the first direction R by the force F exerted by the sealing element 23. The amount of force F may be predefined in the first direction R.

The igniter cap 21, the propellant can 14, and the baffle element 10 are mounted in the housing 2 and are movable in the first direction R so that the force F with which the sealing element 23 presses against the igniter 20 may be transmitted via the igniter cap 21, the propellant can 14, and the baffle element 10 to the spring element 26. The force F may be adjustable to a predetermined value by adjusting the constant of the spring element 26.

Figure 3:
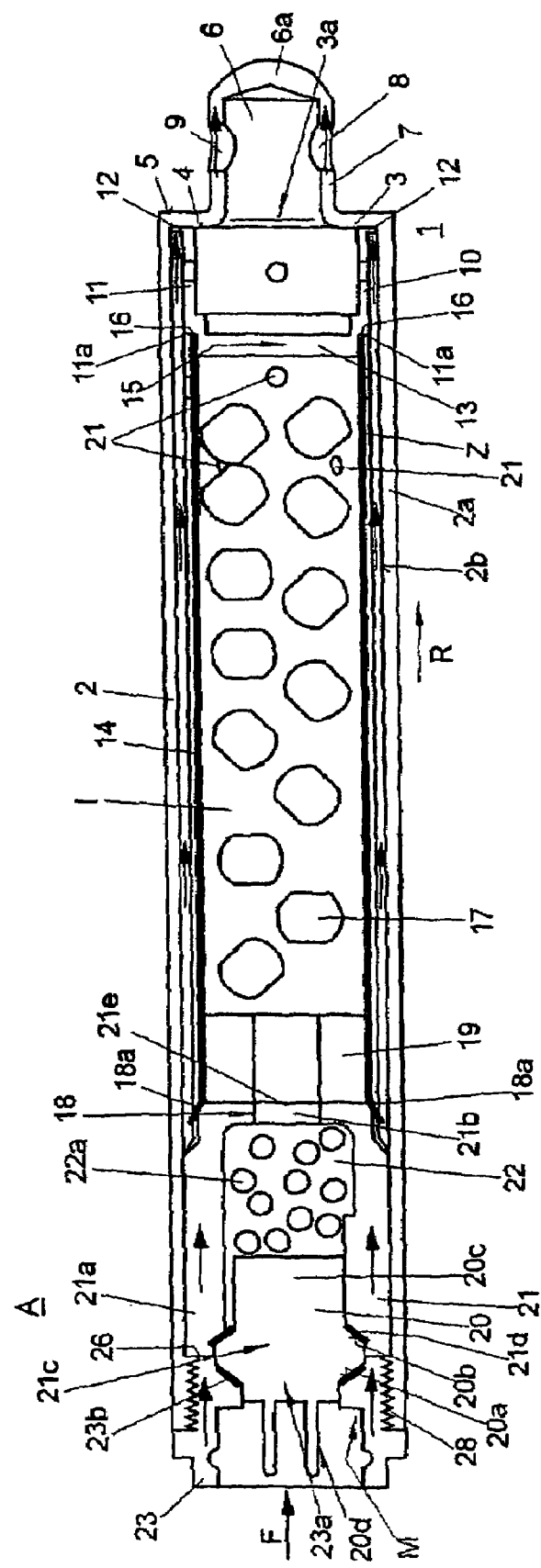
FIG. 3 shows a further modification of the gas generator shown in FIG. 1 according to an exemplary embodiment.

FIG. 3 shows an exemplary embodiment similar to the gas generator 1 shown in FIG. 1, in which the sealing element 23 is not clamped or form fit together with the housing 2 but rather is screwed into the mounting orifice M of the housing 2. The housing 2 has a thread on a peripheral area 28 surrounding the mounting orifice M. The peripheral area 28 faces the inner chamber I of the housing 2 in which a thread of the sealing element 23 engages. The force F may be variably adjusted in the first direction depending on the screw-in depth of the sealing element 23 so that the spring element 26 is unnecessary. To prevent twisting of the sealing element 23, the sealing element 23 may comprise a locking element (not shown) so that a predefined screw-in depth of the sealing element 23 in the first direction R may be determined in a reliable manner.

As described above, an embodiment is directed to a method of producing a gas generator, comprising the steps of arranging an igniter in an inner chamber surrounded by a housing of the gas generator, the igniter being supported in a first direction on a part of the gas generator and in the first direction opposite a mounting orifice of the housing and arranging a sealing element in the mounting orifice to seal the mounting orifice, the sealing element pressing over a bearing area deformable in the first direction with a force acting in the first direction against a first bearing area of the igniter and forming a gas-tight joint between the sealing element and the igniter. A side of the sealing element facing the part of the gas generator in the first direction abuts against a side of the part of the gas generator to limit deformation of the bearing area of the sealing element in the first direction. According to another embodiment, the sealing element may be arranged in the mounting orifice so that a spring element is deformed by the force in the first direction.

According to an embodiment of the method, the sealing element may be arranged relative to the igniter so that an opening in the sealing element at least partially surrounds the igniter. Also, a contact zone may be provided for activating the igniter is guided through the opening in the sealing element so the contact zone is accessible from the outer chamber of the housing once the sealing element has been arranged in the mounting orifice.

The method may further include the step of arranging an igniter cap in the inner chamber of the housing so the igniter cap is supported in the first direction against the part of the gas generator located in the inner chamber. The igniter cap may be arranged in the inner chamber of the housing so that an orifice of the igniter cap faces the mounting orifice of the housing in the first direction. The sealing element may be preassembled with the igniter outside the inner chamber of the housing to form a sub-module. The sub-module may be introduced with the igniter into the housing through the mounting orifice so the sealing element is in the mounting orifice. Also, the igniter may be arranged in the inner chamber of the gas generator to cover the orifice in the igniter cap to form a pressure chamber of the gas generator, and the igniter may be introduced with a free end portion into the orifice in the igniter cap, the igniter being positioned transverse to the first direction.

The method may also include arranging a propellant can in the inner chamber of the housing so that the can is supported against the baffle element with a second peripheral area opposite the baffle element in the first direction. The propellant can is configured to be filled with a propellant. A resilient and deformable volume compensating element may be introduced into the propellant can in the first direction.

According to another embodiment, as described above, a gas generator is provided. The gas generator includes a housing surrounding an inner chamber of the gas generator and an igniter for igniting the gas generator to generate a gas, the igniter being supported in a first direction on a part of the gas generator. The housing includes a mounting orifice through which components of the gas generator may be introduced into the inner chamber during mounting of the gas generator. Also, a sealing element is provided for sealing the mounting orifice, the sealing element being arranged in the mounting orifice to press against a first bearing area of the igniter via a bearing area deformable in the first direction with a force acting in the first direction. A gap may be defined between the sealing element and the part of the gas generator when the two bearing areas come into surface contact when moving in the first direction. The gap is closable by pressing the sealing element in the first direction towards the first bearing area, limiting deformation of the bearing area of the sealing element in the first direction.

According to an alternative embodiment, the sealing element comprises an opening for receiving a contact zone for activating the igniter. Also, the sealing element and the igniter may comprise a preassembled sub-module. In another alternative embodiment, the part of the gas generator supporting the igniter may comprise an igniter cap surrounding a pressure chamber of the gas generator. The igniter cap may include an orifice opposite the mounting orifice in the first direction, and the orifice of the igniter cap is bound by a bearing area of the igniter cap that annularly surrounds the orifice. In an alternative arrangement, the bearing area of the igniter cap comprises a funnel for positioning the igniter relative to the igniter cap in a plane oriented perpendicular to the first direction.

As described above, the gas generator may include a propellant can filled with propellant and extending in the first direction in the inner chamber of the housing. A volume compensating element may be introduced into the propellant can in the first direction, the volume compensating element pressing in the first direction against the propellant so that movement of the propellant is suppressed. In addition, the propellant can may include a first orifice opposite the mounting orifice in the first direction. The first orifice of the propellant can may be bound by a first peripheral area of the propellant can.

According to another alternative embodiment, the propellant can may be supported with a second peripheral area that bounds the second orifice against a baffle element arranged in the first direction between the propellant can and an inner side facing the mounting orifice, the baffle element swirling the gases generated in the propellant can. The baffle element may include a flat area extending transverse to the first direction and closing the second orifice of the propellant can.

According to another alternative embodiment, the sealing element is clamped together with an area of the housing so the sealing element presses against the igniter with the force acting in the first direction. The area of the housing may be arranged to surround the sealing element. Also, the gas generator may be configured so that the area projects transverse to the first direction into an inner chamber surrounded by the housing.

The priority application, German Patent Application No. 10 2006 002435.4, filed Jan. 12, 2006, including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. A method of producing a gas generator, comprising:
arranging an igniter in an inner chamber surrounded by a housing of the gas generator, the igniter being supported in a first direction on a part of the gas generator and in the first direction opposite a mounting orifice of the housing; and
arranging a sealing element in the mounting orifice to seal the mounting orifice, the sealing element pressing over a bearing area deformable in the first direction with a force acting in the first direction against a first bearing area of the igniter and forming a gas-tight joint between the sealing element and the igniter;
wherein a side of the sealing element facing the part of the gas generator in the first direction abuts against a side of the part of the gas generator to limit deformation of the bearing area of the sealing element in the first direction and to close a gap, wherein the gap is defined between the side of the sealing element and the part of the gas generator when the bearing area of the sealing element and the first bearing area of the igniter come into surface contact when moving in the first direction.

2. The method as claimed in claim 1, wherein the sealing element is arranged in the mounting orifice so a bearing area surrounding the opening in the sealing element is pressed to form a gas-tight joint.

3. The method as claimed in claim 2, wherein the bearing area of the sealing element and a first bearing area of the igniter are deformed in the first direction by the force so that the two bearing areas rest against one another to form a gas-tight joint.

4. The method as claimed in claim 3, further comprising the step of arranging an igniter cap in the inner chamber of the housing so the igniter cap is supported in the first direction against the part of the gas generator located in the inner chamber, and wherein a side of the sealing element facing the igniter cap in the first direction abuts against a side of the igniter cap facing the sealing element in the first direction to limit deformation of the bearing area of the sealing element and of the first bearing area of the igniter in the first direction.

5. The method as claimed in claim 4, wherein the igniter cap is arranged in the inner chamber of the housing so that an orifice of the igniter cap faces the mounting orifice of the housing in the first direction, wherein the igniter is arranged in the inner chamber of the gas generator to cover the orifice in the igniter cap to form a pressure chamber of the gas generator, and wherein the sealing element is arranged in the mounting orifice so that the igniter is pressed for gas-tight closure of the pressure chamber, wherein a second bearing area against a bearing area of the igniter cap surrounds the orifice of the igniter cap by the force acting in the first direction.

6. The method as claimed in claim 5, wherein the second bearing area of the igniter and/or the bearing area of the igniter cap is deformed in the first direction by the force so the two bearing areas rest against one another for gas-tight closure or seal of the pressure chamber.

7. The method as claimed in claim 6, wherein the side of the sealing element facing the igniter cap in the first direction abuts against the side of the igniter cap facing the sealing element in the first direction to limit deformation of the second bearing area of the igniter and/or of the bearing area of the igniter cap in the first direction.

8. The method as claimed in claim 1, wherein a baffle element for swirling the gases released by the gas generator is arranged in the inner chamber of the housing, the baffle element supported on an inner side of the housing facing the mounting orifice in the first direction.

9. The method as claimed in claim 8, wherein a spring element is arranged in the first direction between the inner side and the baffle element, the spring element being resilient and deformable in the first direction.

10. The method as claimed in claim 8, wherein a propellant can is arranged in the inner chamber of the housing and is supported against the baffle element with a peripheral area opposite the baffle element in the first direction.

11. The method as claimed in claim 10, wherein the sealing element is arranged in the mounting orifice so the force exerted by the sealing element on the igniter is introduced into the housing via the propellant can and the baffle element.

12. The method as claimed in claim 1, wherein the sealing element is clamped or form fit together with an area of the housing surrounding the mounting orifice to generate the force acting in the first direction.

13. The method as claimed in claim 12, wherein the sealing element is clamped together with the housing so the area projects transverse to the first direction into an inner chamber surrounded by the housing and engages transverse to the first direction in a recess or a groove of the sealing element.

14. The method as claimed in claim 1, wherein the sealing element is screwed into the mounting orifice to generate the force acting in the first direction.

15. A gas generator comprising:
a housing surrounding an inner chamber of the gas generator;
an igniter for igniting the gas generator to generate a gas, the igniter being supported in a first direction on a part of the gas generator;
a mounting orifice of the housing through which components of the gas generator may be introduced into the inner chamber during mounting of the gas generator; and
a sealing element for sealing the mounting orifice, the sealing element arranged in the mounting orifice to press against a first bearing area of the igniter via a bearing area deformable in the first direction with a force acting in the first direction;
wherein, a gap is defined between the sealing element and the part of the gas generator when the two bearing areas come into surface contact when moving in the first direction; and
wherein the gap is closable by pressing the sealing element in the first direction towards the first bearing area, limiting deformation of the bearing area of the sealing element in the first direction.

16. The gas generator as claimed in claim 15, wherein the sealing element comprises an opening for receiving a contact zone for activating the igniter, and wherein the bearing area of the sealing element annularly surrounds the opening transverse to the first direction.

17. The gas generator as claimed in claim 16, wherein the bearing area of the sealing element and/or the first bearing area of the igniter is a first seal element deformable in the first direction, the first seal element deformed by the sealing element pressing against the igniter in the first direction so that the two bearing areas rest against one another and form a seal.

18. The gas generator as claimed in claim 17, wherein the gap is closable by pressing the sealing element in the first direction, limiting deformation of the first seal element in the first direction.

19. The gas generator as claimed in claim 15, wherein the sealing element and the igniter close the mounting orifice in a gas-tight manner.

20. The gas generator as claimed in claim 15, wherein the part of the gas generator supporting the igniter comprises an igniter cap surrounding a pressure chamber of the gas generator, and wherein the igniter cap comprises an orifice opposite the mounting orifice in the first direction, and wherein the orifice of the igniter cap is bound by a bearing area of the igniter cap that annularly surrounds the orifice, and wherein the sealing element is arranged in the mounting orifice to press the igniter with a second bearing area against the bearing area of the igniter cap with the force acting in the first direction for gas-tight closure of the pressure chamber.

21. The gas generator as claimed in claim 20, wherein the second bearing area of the igniter and/or the bearing area of the igniter cap takes the form of a second seal element deformable in the first direction, the second seal element is deformed in the first direction so the two bearing areas rest against one another to form a seal.

22. The gas generator as claimed in claim 21, wherein the gap is formed between the sealing element and the igniter cap in the first direction when the two bearing areas come into surface contact, the gap closable by pressing the sealing element in the first direction so deformation of the second seal element is limited in the first direction.

23. The gas generator as claimed in claim 15, wherein the gas generator comprises a propellant can filled with propellant and extending in the first direction in the inner chamber of the housing, and wherein the propellant can comprises a first orifice opposite the mounting orifice in the first direction.

24. The gas generator as claimed in claim 23, wherein the propellant can comprises a second orifice opposite the first orifice in the first direction.

25. The gas generator as claimed in claim 24, wherein the propellant can is supported with a second peripheral area that bounds the second orifice against a baffle element arranged in the first direction between the propellant can and an inner side facing the mounting orifice, the baffle element swirling the gases generated in the propellant can.

26. The gas generator as claimed in claim 25, wherein the baffle element is supported in the first direction against the inner side of the housing so that the force the sealing element exerts on the igniter is introduced into the housing via the baffle element.

27. The gas generator as claimed in claim 25, wherein the baffle element is supported in the first direction on a spring element arranged between the inner side and the baffle element in the first direction to absorb the force the sealing element exerts on the igniter.

28. The gas generator as claimed in claim 15, wherein the part of the gas generator supporting the igniter comprises an igniter cap surrounding a pressure chamber of the gas generator, and wherein the gas generator comprises a propellant can filled with propellant and extending in the first direction in the inner chamber of the housing and wherein the igniter cap is supported in the first direction against the first peripheral area of the propellant can so the force that the sealing element exerts in the first direction on the igniter is introduced into the housing via the propellant can.

29. The gas generator as claimed in claim 15, wherein the sealing element is clamped together with an area of the housing so the sealing element presses against the igniter with the force acting in the first direction.

30. The gas generator as claimed in claim 29, wherein the area of the housing engages transverse to the first direction in a recess, the recess comprising a groove surrounding the sealing element.

31. The gas generator as claimed in claim 15, wherein the sealing element is screwed into the mounting orifice so the sealing element presses against the igniter with the force acting in the first direction.

\* \* \* \* \*